US008611252B2

(12) United States Patent
Cai et al.

(10) Patent No.: US 8,611,252 B2
(45) Date of Patent: *Dec. 17, 2013

(54) METHOD OF ROUTING MULTICAST TRAFFIC

(75) Inventors: Yiqun Cai, Cupertino, CA (US); Toerless Eckert, Mountian View, CA (US); Lorenzo Vicisano, Berkeley, CA (US); Arjen Boers, Sitges (ES); Daniel A. Alvarez, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/558,073

(22) Filed: Jul. 25, 2012

(65) Prior Publication Data

US 2012/0294309 A1   Nov. 22, 2012

Related U.S. Application Data

(63) Continuation of application No. 11/423,375, filed on Jun. 9, 2006, now Pat. No. 8,259,612.

(51) Int. Cl.
*H04L 12/28* (2006.01)
*H04L 12/54* (2013.01)

(52) U.S. Cl.
USPC .......................................... 370/254; 370/390

(58) Field of Classification Search
None
See application file for complete search history.

(56) References Cited

U.S. PATENT DOCUMENTS

| | | | |
|---|---|---|---|
| 6,252,856 B1 | 6/2001 | Zhang | |
| 6,847,638 B1 | 1/2005 | Wu et al. | |
| 7,310,335 B1 * | 12/2007 | Garcia-Luna-Aceves et al. | 370/390 |
| 7,797,382 B2 * | 9/2010 | Bou-Diab | 709/204 |
| 8,259,612 B2 | 9/2012 | Cai et al. | |
| 2002/0129086 A1 * | 9/2002 | Garcia-Luna-Aceves et al. | 709/200 |
| 2003/0023701 A1 | 1/2003 | Norman et al. | |
| 2003/0086422 A1 | 5/2003 | Klinker et al. | |
| 2003/0179742 A1 | 9/2003 | Ogier et al. | |
| 2004/0037279 A1 | 2/2004 | Zelig et al. | |
| 2004/0076149 A1 * | 4/2004 | Parent et al. | 370/389 |
| 2004/0081154 A1 | 4/2004 | Kouvelas | |
| 2004/0100970 A1 | 5/2004 | Gerdisch et al. | |
| 2004/0122890 A1 | 6/2004 | Watkinson | |
| 2005/0083933 A1 * | 4/2005 | Fine et al. | 370/390 |
| 2005/0180447 A1 | 8/2005 | Lim et al. | |
| 2006/0088031 A1 * | 4/2006 | Nalawade | 370/390 |
| 2006/0221859 A1 | 10/2006 | Bijwaard et al. | |
| 2007/0127474 A1 | 6/2007 | Mirtorabi et al. | |
| 2007/0286093 A1 | 12/2007 | Cai et al. | |

FOREIGN PATENT DOCUMENTS

| | | |
|---|---|---|
| CN | ZL 200780021356.1 | 8/2012 |
| WO | WO-0219624 A2 | 3/2002 |
| WO | WO-2007142705 A1 | 12/2007 |

OTHER PUBLICATIONS

"European Application Serial No. 07717162.7, Response filed Sep. 17, 2012 to Office Action mailed May 15, 2012", 2 pgs.

U.S. Appl. No. 11/423,375, Examiner Interview Summary mailed Jun. 21, 2011, 3 pgs.

(Continued)

*Primary Examiner* — John Blanton
(74) *Attorney, Agent, or Firm* — Schwegman Lundberg & Woessner, P.A.

(57) ABSTRACT

A method of routing multicast traffic in a computer network is disclosed. The method comprises associating a plurality of multicast group addresses on a network device with respective multicast routing topologies. A network device and a network are also disclosed.

15 Claims, 6 Drawing Sheets

(56) References Cited

OTHER PUBLICATIONS

U.S. Appl. No. 11/423,375, Examiner Interview Summary mailed Jul. 8, 2010, 4 pgs.
U.S. Appl. No. 11/423,375, Final Office Action mailed Feb. 15, 2011, 19 pgs.
U.S. Appl. No. 11/423,375, Final Office Action mailed Dec. 28, 2009, 18 pgs.
U.S. Appl. No. 11/423,375, Non Final Office Action mailed Apr. 28, 2009, 16 pgs.
U.S. Appl. No. 11/423,375, Non-Final Office Action mailed Apr. 13, 2010, 18 pgs.
U.S. Appl. No. 11/423,375, Non-Final Office Action mailed Oct. 31, 2008, 17 pgs.
U.S. Appl. No. 11/423,375, Notice of Allowance mailed May 7, 2012, 7 pgs.
U.S. Appl. No. 11/423,375, Response filed Jan. 27, 2012 to Non Final Office Action mailed Oct. 31, 2008, 22 pgs.
U.S. Appl. No. 11/423,375, Response filed Feb. 24, 2010 to Final Office Action mailed Dec. 28, 2009, 12 pgs.
U.S. Appl. No. 11/423,375, Response filed Jun. 15, 2011 to Final Office Action mailed Feb. 15, 2011, 11 pgs.
U.S. Appl. No. 11/423,375, Response filed Jul. 12, 2010 to Non Final Office Action mailed Apr. 13, 2010, 11 pgs.
U.S. Appl. No. 11/423,375, Response filed Aug. 26, 2009 to Non Final Office Action mailed Apr. 28, 2009, 12 pgs.
Chinese Application Serial No. 200780021356.1, Office Action mailed Jul. 29, 2011, English translation, 7 pgs.
Chinese Application Serial No. 200780021356.1, Response filed Oct. 24, 2011 to Office Action mailed Jun. 9, 2011, 11 pgs.
European Application Serial No. 07717162, Extended European Search Report mailed Dec. 7, 2010, 6 pgs.
European Application Serial No. 07717162.7, Office Action mailed May 15, 2012, 6 pgs.
International Application Serial No. PCT/US07/02737, International Search Report Sep. 20, 2007, 4 pgs.
International Application Serial No. PCT/US07/02737, Written Opinion Sep. 20, 2007, 7 pgs.
"Multi-Topology Routing", Cisco Systems, Inc IOS Release 12.2(33)SRB, (Feb. 27, 2007), 72 pgs.
Deering, S, ""Multicast Routing in Internetworks and Extended LANs"", ACM SIGCOMM. 1988. vol. 18, No. 4., (Aug. 1988), pp. 89-101.
Przygienda, T., et al., "M-ISIS: Multi Topology (MT) Routing in Intermediate System to Intermediate Systems (IS-ISs)", [Online]. Retrieved from the Internet: <http://tools.ietf.org/html/rfc5120>, (Jan. 26, 2009), 15 pgs.
Przygienda, Tony, ""M-ISIS: Multi Topology (MT) Routing in IS-IS"."., Internet Draft, Network Working Group. IETF, <http://tools.ietf.org/html/draft-ietf-isis-wg-mu lti-topology-09.txt>, (Mar. 2005) 26 pgs.
Psenak, P., et al., "Milti-Topology (MT) Routing in OSPF", [Online]. Retrieved from the Internet: <URL:http://tools.ietf.org/html/rfc4915>, (Jan. 26, 2009), 21 pgs.

* cited by examiner

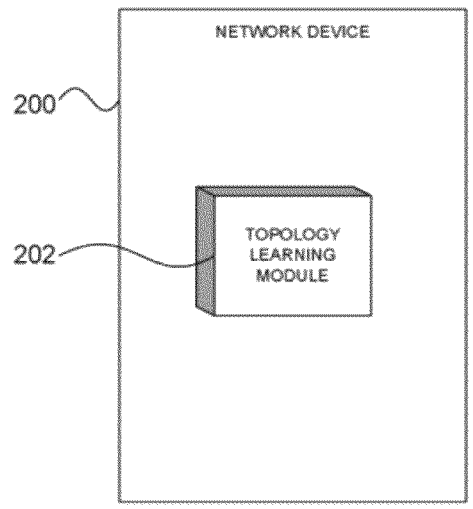
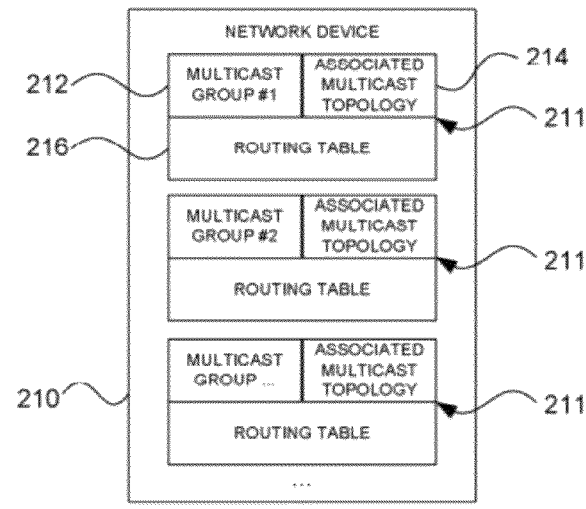
FIG 2a  FIG 2b
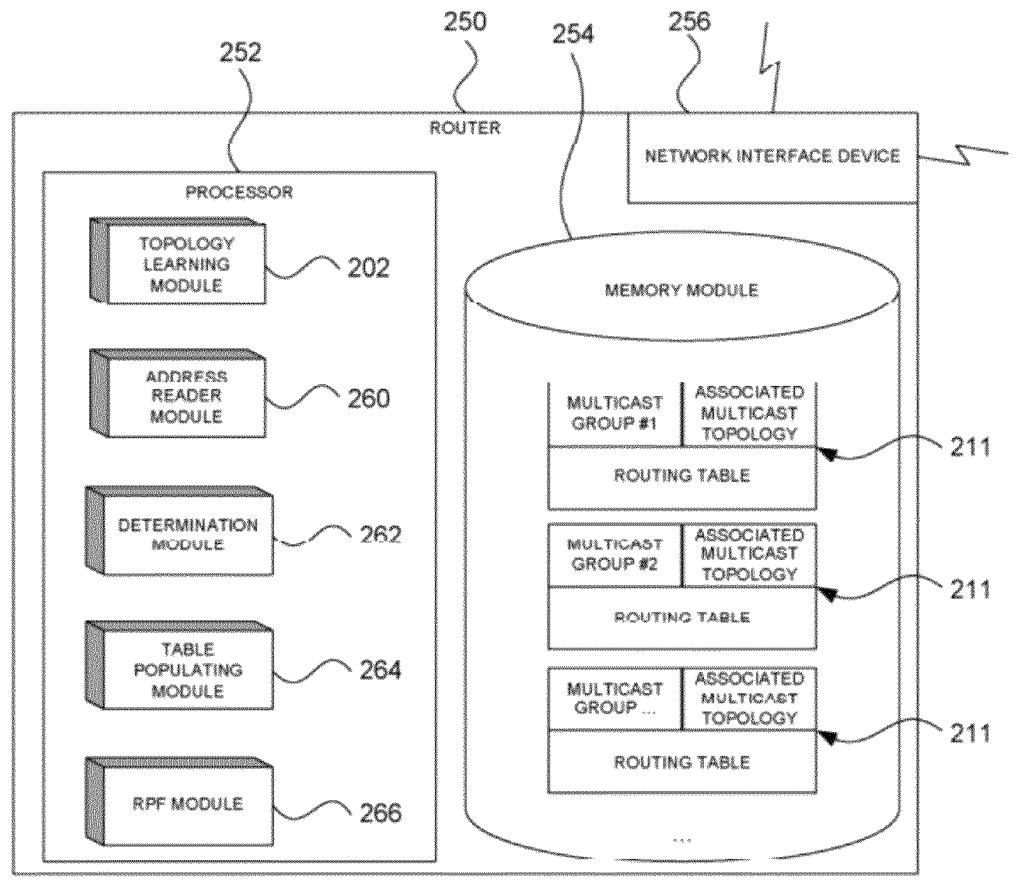
FIG 2c

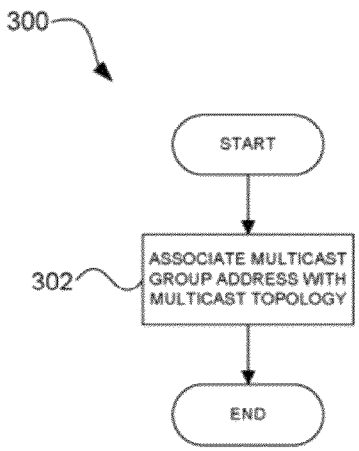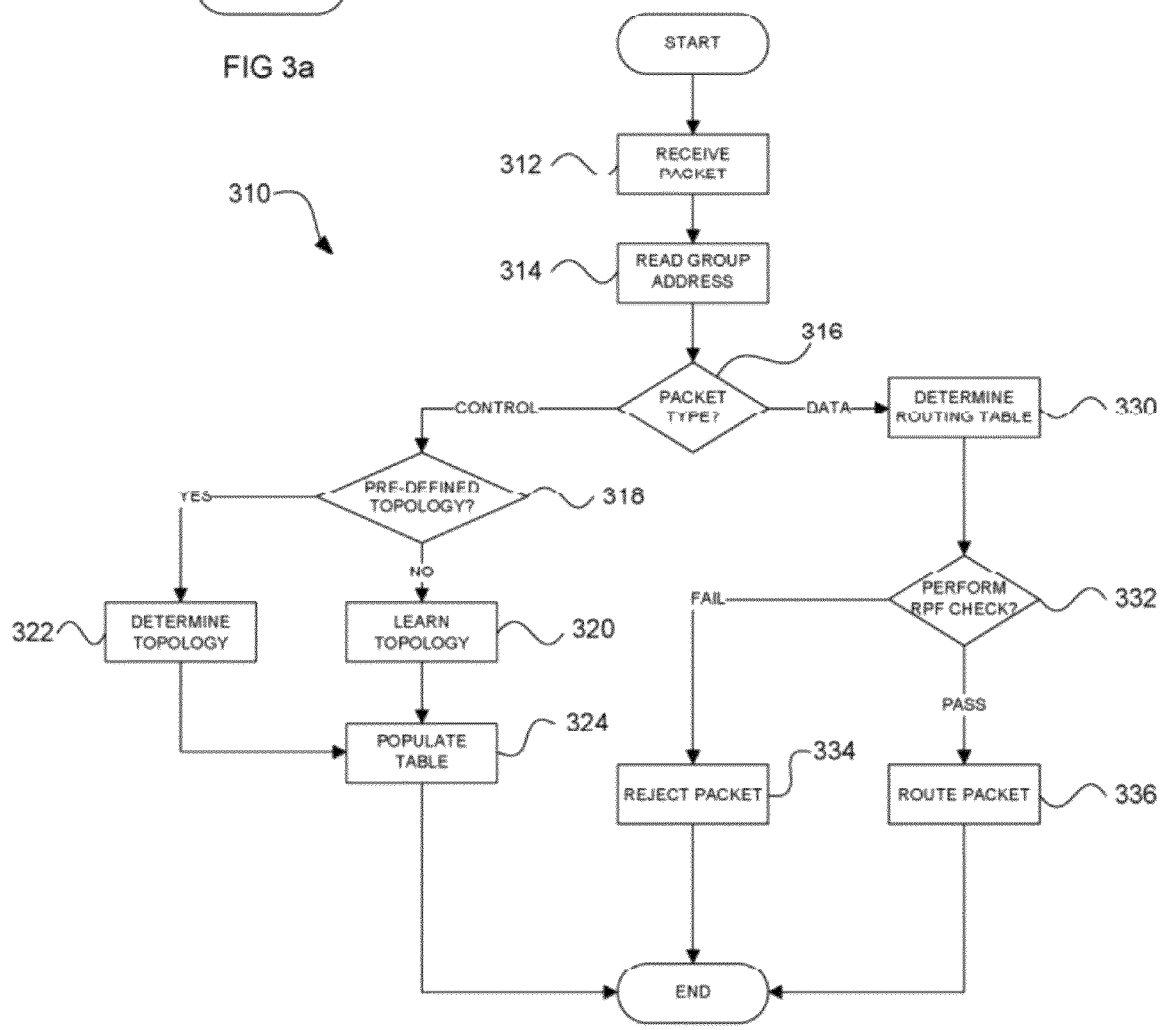
FIG 3a
FIG 3b

METHOD OF ROUTING MULTICAST TRAFFIC

CLAIM OF PRIORITY

This application is a continuation of and claims the benefit of priority under 35 U.S.C. §120 to U.S. patent application Ser. No. 11/423,375, filed on Jun. 9, 2006, which is hereby incorporated by reference herein in its entirety.

FIELD

This application relates generally to multicasting over a computer network, and particularly to a method of and network for routing multicast traffic.

BACKGROUND

Multicast communication is an efficient way to send data over a computer network from a single source to a plurality of hosts or destinations. Multicast data, in the form of multicast packets, is sent from a source (S) address to a group (G) address. Multicast routing comprises two functional components. One component is a Reverse Path Forwarding (RPF) check to verify the interface on which the packet is received using information in a topology table. The other component is replication which is to forward the packet to interface(s) described by entries in a routing table.

In unicast routing, unicast packets are sent from a single source to a single host or destination. The packets are routed by network devices, such as routers, towards a destination address (typically an IP address). The source address of a unicast packet therefore plays little or no part in routing of unicast data, with the unicast packets being routed based on their destination address.

In Multi-Topology Routing (MTR), e.g. routing between networks having different topologies and/or protocols, the forwarding table chosen to route an incoming packet is determined by DSCP (Differentiated Services Code Point) bits in the packet header. Unicast routing protocols (e.g. OSPF and ISIS) are enhanced to build different topologies by incorporating "color-marking" in a route advertisement.

There are certain limitations when this model is extended to multicast routing. For example, multicast routing states can be created by end hosts joining and/or leaving a group. It is not practical to modify the operating system on these systems to include a "color" in the IGMP (Internet Group Management Protocol) packets. Therefore, last-hop routers are restricted to supporting only one multicast routing table for a given group or a given source/group pair. This in turn makes it very complex to define multiple topologies in the transit routers for the same group or source/group pair.

A somewhat different difficulty applies in a MVPN (Multicast Virtual Private Network). In the current MVPN environment, for a given source, the topology table can be obtained from one and only one VRF (Virtual Routing and Forwarding) device. With this restriction, if a source sends multiple multicast streams to different MVPNs, and if there are hosts or receivers interested in different combination of the streams, the source has to use a unique IP address per stream to deliver the traffic. This introduces additional management overhead.

BRIEF DESCRIPTION OF DRAWINGS

The present invention is illustrated by way of example and not limitation in the figures of the accompanying drawings, in which like references indicate similar elements and in which:

FIGS. 2a and 2b show high-level schematic representations of a network device in accordance with example embodiments.

FIG. 2c shows a low-level schematic representation of a router in accordance with an example embodiment.

FIG. 3a shows a high-level flow diagram of a method in accordance with an example embodiment.

FIG. 3b shows a low-level flow diagram of a method in accordance with an example embodiment.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

Figure 1A:
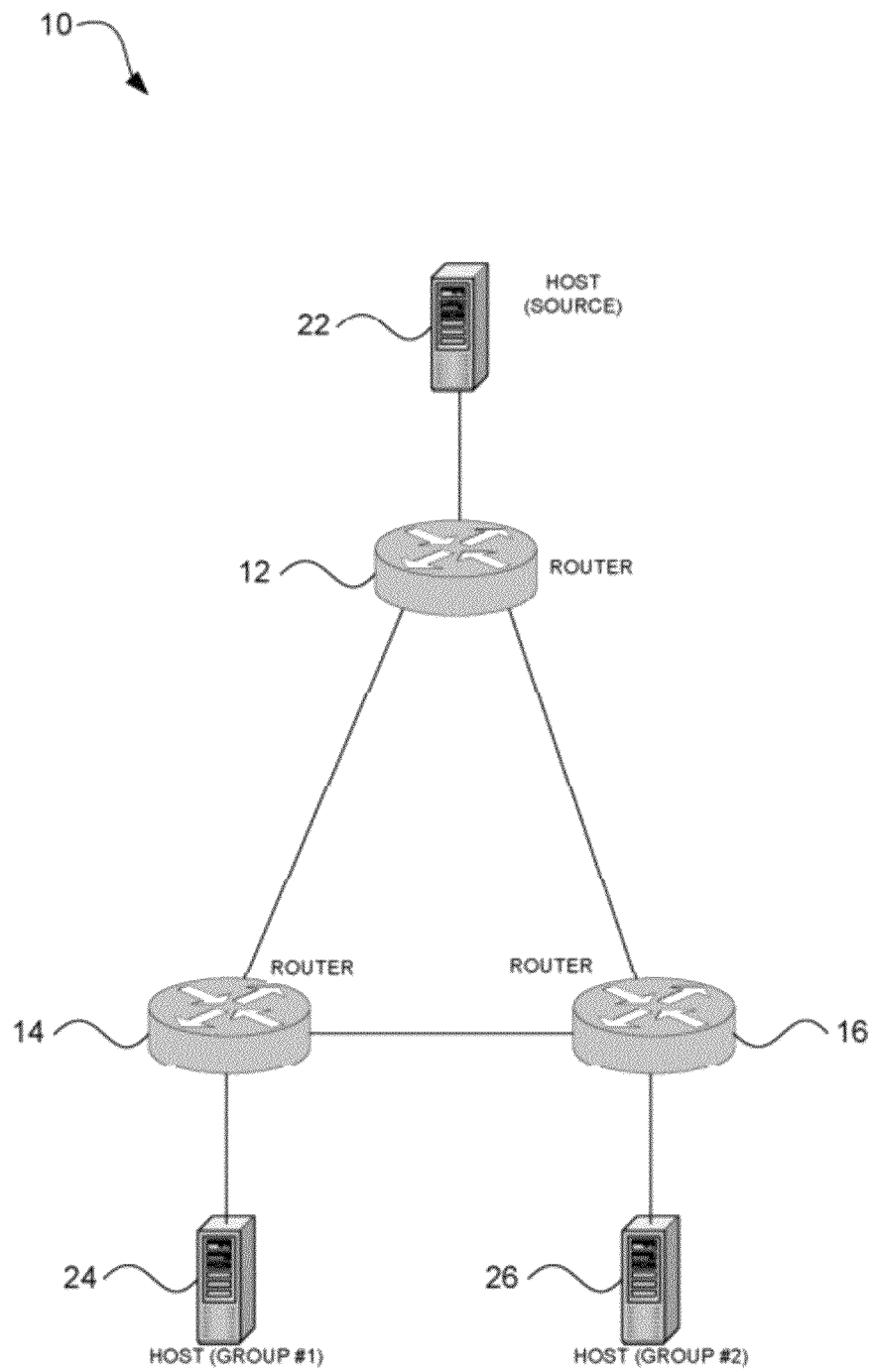
FIG. 1a shows a schematic representation of a computer network having one autonomous routing domain in accordance with an example embodiment.

FIG. 1a shows a computer network 10 having one autonomous routing domain which is configured for routing multicast traffic in accordance with an example embodiment. More particularly, the computer network 10 comprises at least one network device having thereon respective multicast group addresses associated with respective multicast routing topologies. The term "topology" in this context is understood to include VRF. The network 10 includes a plurality of network devices, e.g. multicast routers 12 to 16, and a plurality of hosts, e.g. hosts 22 to 26 networked to the routers 12 to 16.

Figure 1B:
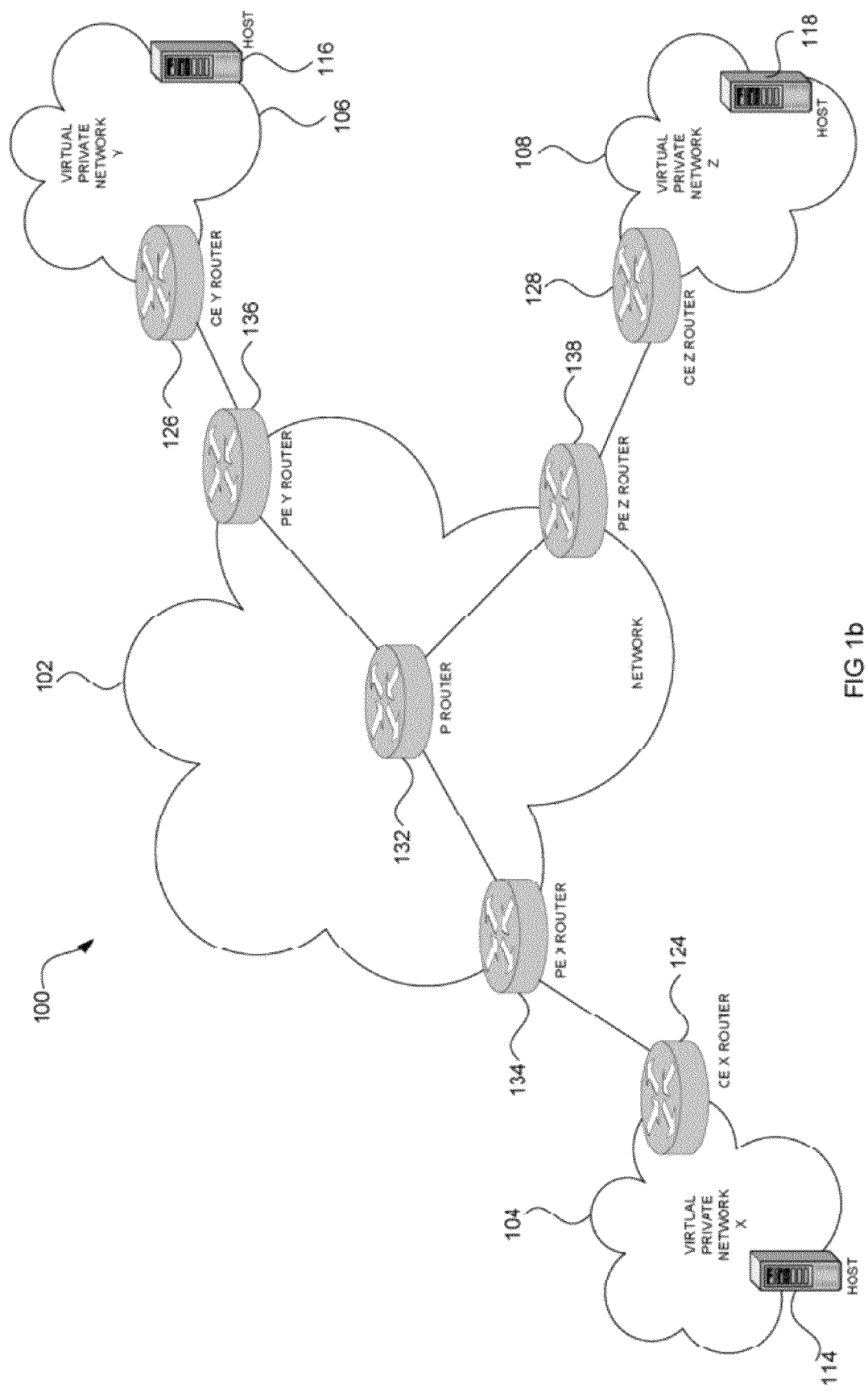
FIG. 1b shows a schematic representation of a computer network having multiple autonomous routing domains in accordance with an example embodiment.

FIG. 1b shows a computer network 100 which is configured for routing multicast traffic in accordance with an example embodiment. The network 100 may have multiple autonomous routing domains (e.g. multicast virtual private networks).

The network 100 includes a backbone or intermediate network 102 (e.g. the Internet), and a plurality of sub-networks 104 to 108 in communication with the intermediate network 102. The sub-networks 104 to 108 in the example embodiment are Virtual Private Networks (VPNs) and the network 100 is therefore an MVPN (Multicast Virtual Private Network). Each VPN 104 to 108 (respectively labelled "Virtual Private Network X", "Virtual Private Network Y", and "Virtual Private Network Z") may be an autonomous routing domain and include at least one host 114 to 118.

The intermediate network 102 and the VPNs 104 to 108 are interconnected by way of a plurality of network devices which, in the example embodiment, are routers. In other embodiments, the network devices may be any network device capable of routing network packets, e.g. switches, computer systems, or the like. Each VPN 104 to 108 includes at least one router. For clarity of description, only the CE (Customer Edge) routers 124 to 128 are shown in the drawing (respectively labelled "CE X", "CE Y", and "CE Z" corresponding to the VPN 104 to 108 to which they are connected).

The backbone network 102 also includes a plurality of routers, amongst which are PE (Provider Edge) routers 134 to 138 (respectively labelled "PE X", "PE Y", and "PE Z" corresponding to the VPN which they connect to the backbone network 102). The backbone network 102 may include one or more further provider (P) routers 132, only one of which is shown.

Figure 1C:
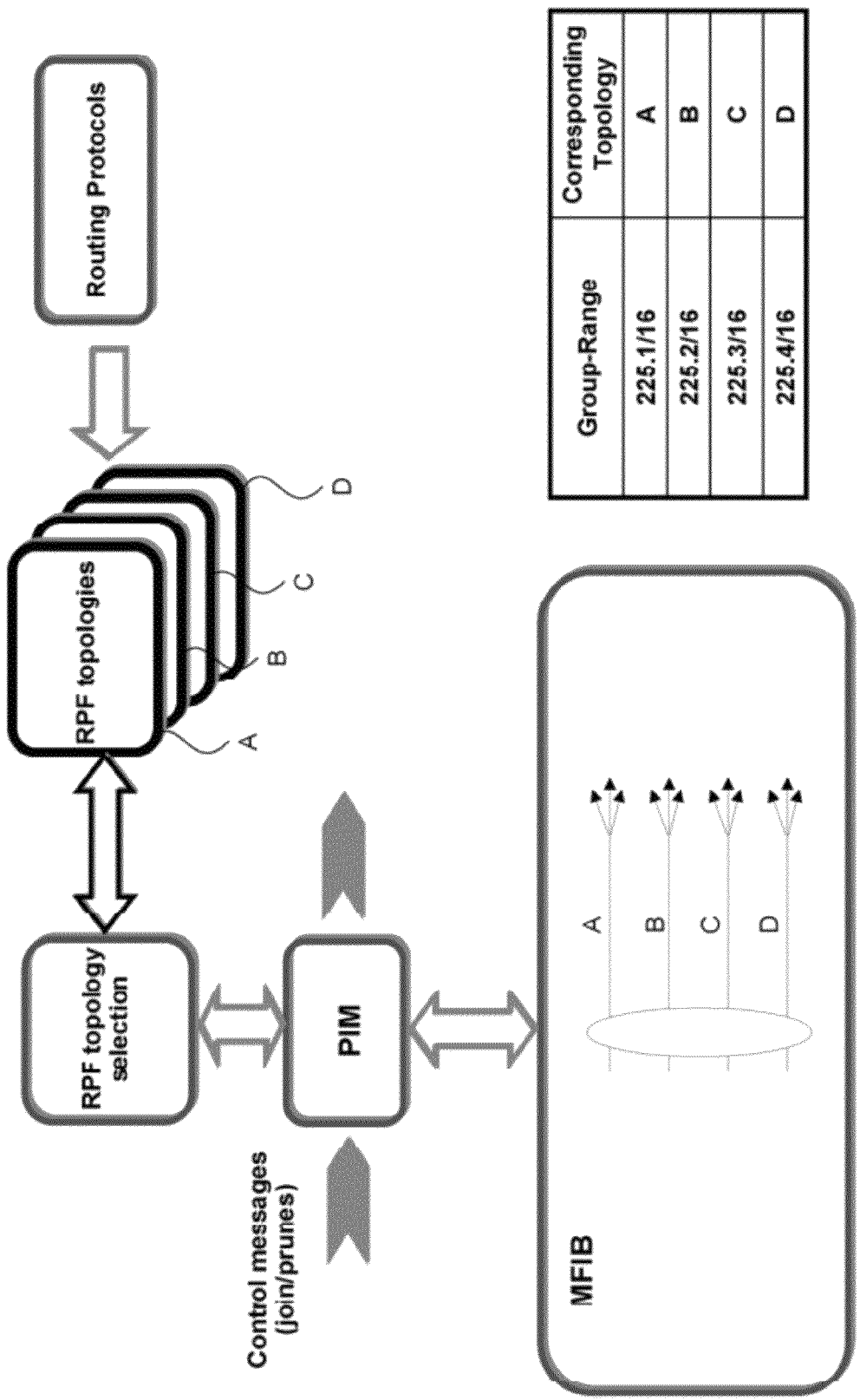
FIG. 1c shows a high level functional representation of a multicast multiple topology in accordance with an example embodiment.

As described in more detail herein, in an example embodiment a topology and routing table may be identified using group addresses in multicast protocols (e.g., PIM, IGMP, MSDP, or the like) or in an IP header of incoming packets. For example, as shown in FIG. 1c, a plurality of topologies (e.g., topologies A, B, C, and D may correspond to a group address. For example, a multicast group address 225.1/16 may correspond to topology A, a multicast group address 225.2/16 may correspond to topology B, a multicast group address 225.3/16 may correspond to topology C, a multicast group address 225.4/16 may correspond to topology D.

FIG. 2a shows a network device 200 in accordance with an example embodiment. The network device 200 comprises a Topology Learning module 202 which is configured to learn or determine dynamically in which multicast routing topology a particular multicast control packet is formatted by analysing contents (e.g. a header) of the multicast control packet. It is to be appreciated that the Topology Learning module 202 is used for learning the multicast network topology for a particular multicast group address when no routing table and/or forwarding table (referred to for brevity as a routing table) exists, but is not needed once the routing table has been populated or if a particular multicast routing topology was statically associated with that multicast group address 212.

Referring now also to FIG. 2b, a similar network device 210 in accordance with an example embodiment is shown. The network device 210 has stored thereon a plurality of records 211, which may each comprise a group address field 212, an associated multicast network topology 214, and a forwarding or routing table 216 (if present). The group address 212 may have been statically configured (e.g. predefined by a network administrator) to be associated with a particular multicast network topology 214. Instead, the multicast network topology 214 may have been determined by the Topology Learning module 202 (of FIG. 2a) and associated with the group address 212 (e.g. dynamic learning). The network devices 200, 210 may be in the form routers, switches, or the like.

FIG. 2c shows a network device, in the example form of a router 250 in accordance with an example embodiment, in more detail. The router 250 includes a processor 252, a memory module 254, and a network interface device 256 for connecting the router 250 to one or more networks. The network interface device 256 may include a plurality of network interfaces for connection to respective networks.

The processor 252 is divided into a number of conceptual modules which correspond to particular tasks performed by the processor 252. It is to be understood that the router 250 may therefore include software (e.g. a computer program) to direct the operation of the processor 252.

The memory module 254 (e.g. in the form of a hard disk drive, flash memory, or the like) has stored thereon records 211 as described with reference to FIG. 2b. It is to be appreciated, therefore, that router 250 includes not just one global routing table, but a plurality of forwarding or routing tables 216 associated with respective multicast group addresses 212. The processor 252 is in communication with the memory module 254 so that the modules of the processor 252 can access the records 211.

The processor 252 includes the Topology Learning module 202 (as described in FIG. 2a). The processor 252 also includes an Address Reader module 260 to read a group address (or other information, e.g. the packet type) of a multicast packet. The Address Reader module 260 is configured to read this information from a variety of data packet types, such as multicast control packets, multicast data packets, or any other type of multicast packets, for example by reading a header of the multicast packet. The records 211 of the memory module 254 may be interrogated by a Determination module 262 to determine a multicast network topology 214 and/or a routing table 216 associated with the particular multicast group address 212 as read by the Address Reader module 260. A Table Populating module 264 is operable to populate respective routing tables 216 in accordance with the particular multicast network topology 214 of each record 211. The router 250 further has an RPF module 266 to perform an RPF check once the applicable routing table 216 has been determined. If the RPF check is passed, the multicast packet is automatically forwarded by the router 250 to another router via the network interface device 256. The network interface device 256 therefore acts alternately as a sending arrangement and a receiving arrangement.

The routing table 216, in conventional fashion, includes a plurality of multicast source addresses and associated network interfaces against which incoming multicast packets are checked and, if appropriate, routed or forwarded on a different network interface. The RPF check is done to ensure that each multicast packet arrived on the correct network interface for the multicast source address associated with that multicast packet, to eliminate looping and ensure that multicast packets are forwarded only to the appropriate network device(s). If a multicast packet arrived on the wrong network interface (e.g. from an incorrect network device), that multicast packet is simply discarded. In contrast with the prior art, where the RPF check is done against one global routing table, the RPF check, in the example embodiment, is done against an associated one of a plurality of routing tables 216, the associated routing table 216 being determined by the multicast group address 212 of the multicast packet.

An example embodiment is further described in use, with reference to flow diagrams. FIG. 3a is a high-level flow diagram 300 which shows a method of routing multicast traffic in a computer network, in accordance with the invention. The flow diagram 300 comprises associating, at block 302, on a network device multiple multicast group addresses with respective multicast routing topologies.

FIG. 3b is a low-level flow diagram 310 which describes the example embodiment in more detail and reference is also made to FIG. 1a, in which the routers 12 to 16 are similar to the router 250 of FIG. 2c. The method 310 is started when a router 12 to 16 receives, at block 312, a multicast IP packet. For example, a host 24 may send a multicast control packet to an adjacent router 14, indicating that the host 24 wants to join multicast group #1. It is to be understood that a multicast packet may be encapsulated within a unicast packet, but that such a packet is, for brevity, still referred to as a multicast packet. The multicast control packet sent from host 24 may be formatted in any multicast routing protocol, e.g. PIM, IGMP, MSDP, etc. The address Reader Module 260 of the router 14 reads, at block 314, the multicast group address (e.g. multicast group #1) from the multicast control packet.

The router 14 then determines, at block 316 (e.g. using the Address Reader module 260) if the received packet is a multicast control packet and that it can therefore be used for creating or populating routing tables. If so, the router 14 thereafter checks, at block 318, whether or not a particular multicast network topology for multicast group #1 has been statically configured (e.g. pre-defined by a network administrator). If no network topology has been pre-configured, the Topology Learning module 202 analyses the packet to learn or determine, at block 320, in which multicast topology the packet is formatted (e.g. PIM). A routing table 216 is then populated, at block 324, in accordance with the learned multicast topology. Populating the routing table 216 comprises creating a record or entry 211 in the memory module 254 of the router 14, the record 211 including a multicast group address (e.g. multicast group #1) 212, an associated multicast topology (e.g. PIM) 214, and a routing table 216 (e.g. in accordance with the PIM topology). The router 14 may then generate its own multicast control packets and send them to adjacent or neighboring multicast routers 12, 16, which may populate similar routing tables 216, if appropriate.

Similarly, a router 16 may receive, at block 312, a multicast control packet from a host 26 indicating that the host 26 wants to join multicast group #2. The router 16 reads, at block 314, the multicast group address (multicast group #2), and determines, at block 316, if the multicast packet is a control packet. For example, if it is determined, at block 318, that a multicast network topology associated with multicast group #2 has been statically configured, the Determination module 262 of router 16 determines, at block 322, the pre-defined topology. The associated routing table 216 is then populated, at block 324, in accordance with the IGMP topology. It is thus to be understood that the routers 12 to 16 in the network 10 include a plurality of routing tables, associated with respective multicast group addresses. Thus, multicast group addresses with respective multicast routing topologies may be provided.

When a host 22 transmits a multicast data packet, the packet is received, at block 312, by a router 12 which reads, at block 314, the multicast group address (e.g. multicast group #1) of the packet. The packet is in this case a multicast data packet, and is therefore to be routed in accordance with a routing table. The Determination module 262 of the router 12 determines, at block 330, the appropriate routing table 216 by interrogating the records 211 to determine which routing table 216 is associated with the group address 212 for multicast group #1. The RPF module 266 then performs a RPF check, at block 322, using a multicast source address of the multicast data packet in accordance with the appropriate routing table 216. The RPF check may be performed using a unicast routing table in accordance with the associated multicast topology (e.g. PIM). If the RPF check fails, the packet is rejected or discarded, at block 334. In this example, the RPF check passes, and the multicast data packet may for example be routed, at block 336, to the router 14 for onward forwarding to the host 24 (which is a member of multicast group #1).

The flow diagram 310 is also applicable to network architecture such as the network 100 of FIG. 1b. Each router may still have multiple routing tables but because the network 100, being a MVPN, has multiple autonomous domains, a router in one domain (e.g. router 124 of VPN X 104) may have multiple routing tables 216 which may be different from those of routers in other domains (e.g. the router 126 of VPN Y 106). However, the routers may still include multicast group addresses respectively associated with multicast routing topologies (e.g. different VRFs in the case of MVPN). It is to be appreciated that the example embodiment may find particular application in MVPNs having different autonomous domains, as the routing or RPF table may be obtained one of a plurality of VRFs.

A command to enable group-based VRF selection may be as follow:
ip multicast [vrf<receiver-vrf>] rpf select [vrf<source-vrf>|global] group-list<acl>
For example,
(conf#)access-list 1 permit G1 255.255.255.255
(conf#)ip multicast VPN-X rpf select vrf VPN-Y group-list 1
(conf#)access-list 2 permit G2 255.255.255.255
(conf#)ip multicast VPN-X rpf select vrf VPN-Z group-list 2

In the example above, for all lookups originating in VPN-X, if the group address is G1 the RPF check will be performed in VPN-Y instead and if the group address is G2 the RPF check will be performed in VPN-Z. Thus, RPF functionality may be performed using the same source address in different VRFs.

In an example embodiment, Multi Topology Routing (MTR), the methodologies deliver multiple unicast topologies and class-based forwarding for IP unicast forwarding. In addition, a fully-fledged multicast RPF topology may be provided, that can be constructed fully independently from the unicast topology(ies). In the example embodiment, multicast class-based forwarding is performed based on the group address as herein described. In an example embodiment, a given group address may belong to one and only one topology. Multicast topology differentiation in a forwarding plane can also be performed using a packet attribute, for example the DSCP field, as in the unicast case.

In an example embodiment, IP Multicast the Group Destination Address is only a temporary identification for a Multicast Session that allows one or more Multicast source to deliver data to a group of Multicast Receivers. Two different group addresses can be used to reach the same receiver-set from the same set of sources. For this reason traffic differentiation can be achieved by using multiple group addresses and making sure that the proper paths are chosen when the multicast trees for different group addresses are built. This approach may have the advantage of not adding any new significant requirement neither to the multicast forwarding plane nor to the multicast protocols (IGMP, PIM etc.). In an example embodiment, there my be a need to perform a coordinate management of group addresses with regard to classes of services in a network.

Example Overall Architecture

In an example embodiment, class-based path differentiation for IP Multicast may be achieved by building multiple RPF topologies (e.g., as herein before described), each of which may conform to a normal or conventional unicast topology. However, unlike unicast topologies, the RPF topologies may not be used directly for forwarding, but for building Multicast Forwarding Trees (see for example FIGS. 3a and 3b). At tree-building time (e.g., performed by PIM), the multicast group address may be used as a demultiplexer to select the RPF topology to consult. This may result in the tree for a specific group address being built on paths specified by a given RPF topology. Example router-infrastructure to support this architecture may include:

A) RTMGR/RIB/Routing-Protocols capability of building multiple multicast RPF topologies; and B) Capability of configuring, maintaining and consulting a database to perform the demultiplexing from group address (and potentially other parameters) to RPF topology.

In an example embodiment, to implement the methodologies describe herein, a legacy router may be modified to remove the checks that prevent the configuration of multiple RPF topologies.

Figure 4:
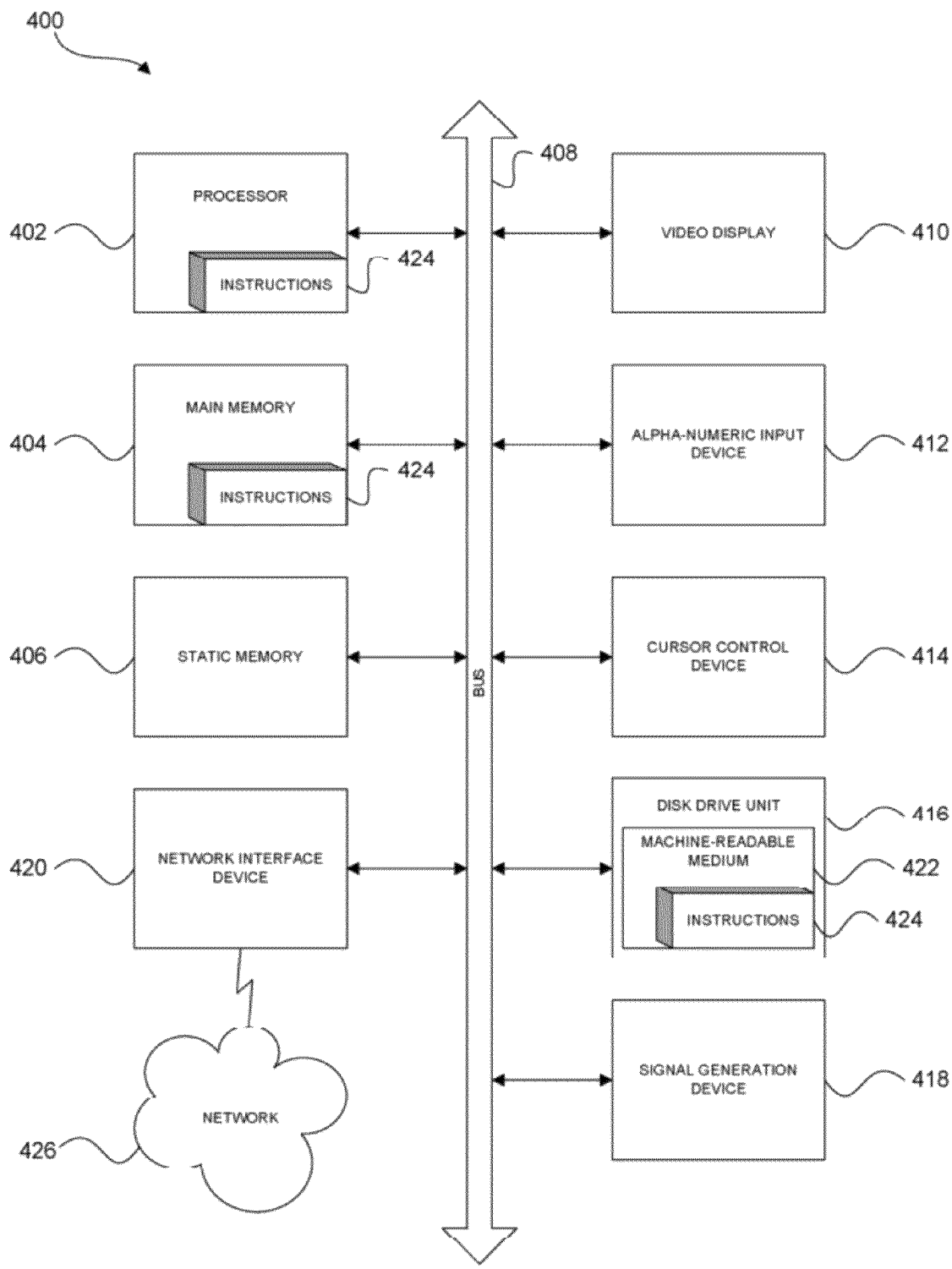
FIG. 4 shows a diagrammatic representation of machine in the example form of a computer system within which a set of instructions, for causing the machine to perform any one or more of the methodologies discussed herein, may be executed.

FIG. 4 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

One or more routers of FIGURES 1a and/or 1b may be in the form of the example computer system 400.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   receiving a multicast data packet at a network device;
   identifying a multicast group address of the multicast data packet;
   identifying which one of a plurality of multicast routing tables on the network device is associated with the identified multicast group address, each of the plurality of multicast routing tables being associated with a respective one of a plurality of multicast group addresses, each multicast routing table indicating a respective one of a plurality of multicast routing topologies; and
   routing the multicast data packet to the identified multicast group address in accordance with a particular multicast routing topology indicated by the identified multicast routing table.

2. The method of claim 1, further comprising performing a RPF (Reverse Path Forwarding) check using a multicast source address of the multicast data packet, the routing of the multicast data packet being conditional upon passing the RPF check.

3. The method of claim 2, wherein the RPF check is performed using a unicast routing table in accordance with the particular associated multicast topology.

4. The method of claim 1, wherein the plurality of multicast routing topologies span multiple autonomous routing domains.

5. The method of claim 4, in which the multiple autonomous routing domains comprise multicast virtual private networks.

6. The method of claim 5, wherein at least two of the virtual private networks have different multicast topologies indicated by respective multicast routing tables on the network device.

7. The method of claim 1, wherein the network device is a router.

8. A method of routing multicast traffic in a computer network, the method comprising, at a routing device, routing multicast packets to each of a plurality of multicast group addresses in accordance with an associated one of a plurality of multicast routing topologies, the plurality of multicast routing topologies being indicated by respective multicast routing tables on the routing device.

9. The method of claim 8, wherein the routing comprises identifying a particular multicast routing topology for a multicast data packet based on a multicast group address of the multicast packet.

10. A network device to route multicast traffic in a computer network, the network device comprising:
    a network interface device to receive receiving a multicast data packet at a network device;
    an address reader module to identify a multicast group address of the multicast data packet; and
    a determination module to identify which one of a plurality of multicast routing tables on the network device is associated with the identified multicast group address, each of the plurality of multicast routing tables being associated with a respective one of a plurality of multicast group addresses, each multicast routing table indicating a respective one of a plurality of multicast routing topologies, to enable routing of the multicast data packet to the identified multicast group address in accordance with a particular multicast routing topology indicated by the identified multicast routing table.

11. The network device of claim 10, further comprising a Reverse Path Forwarding (RPF) module to route the multicast data packet to the identified multicast group address in accordance with the particular multicast routing topology.

12. The network device of claim 11, wherein the RPF module is configured to perform a RPF check using a multicast source address of the multicast data packet, the routing of the multicast data packet being conditional upon passing the RPF check.

13. The network device of claim 10, wherein the plurality of multicast routing topologies span multiple autonomous routing domains.

14. The network device of claim 13, wherein the multiple autonomous routing domains comprise multicast virtual private networks.

15. The network device of claim 14, wherein at least two of the virtual private networks have different multicast topologies indicated by respective multicast routing tables on the network device.

* * * * *